US007334182B2

(12) United States Patent
Keller, Jr. et al.

(10) Patent No.: US 7,334,182 B2
(45) Date of Patent: Feb. 19, 2008

(54) SERIAL DATA PRESERVATION METHOD

(75) Inventors: Thomas H. Keller, Jr., Elgin, IL (US); Nandor C. Toth, Carpentersville, IL (US); Gary E. Mastenbrook, Schaumburg, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 379 days.

(21) Appl. No.: 10/997,547

(22) Filed: Nov. 24, 2004

(65) Prior Publication Data

US 2006/0123290 A1 Jun. 8, 2006

(51) Int. Cl.
*G06F 7/02* (2006.01)

(52) U.S. Cl. ...................................... 714/819; 714/824

(58) Field of Classification Search ................ 714/819, 714/799, 824, 823, 764, 746, 742; 368/107
See application file for complete search history.

(56) References Cited

U.S. PATENT DOCUMENTS 4,943,961 A 7/1990 Sparks
5,005,158 A 4/1991 McClure et al.
5,229,981 A * 7/1993 Maschi ....................... 368/111
5,333,128 A 7/1994 Yoon et al.
5,600,588 A 2/1997 Kawashima
5,652,720 A 7/1997 Aulas et al.
5,740,102 A 4/1998 Kawashima
5,787,479 A 7/1998 Jessani et al.
5,847,577 A 12/1998 Trimberger
5,848,026 A 12/1998 Ramamurthy et al.
5,895,486 A * 4/1999 Patel .......................... 711/121
6,075,731 A 6/2000 Hamakawa et al.
6,137,738 A 10/2000 Vorgert
6,221,705 B1 4/2001 Rost et al.
6,237,054 B1 5/2001 Freitag, Jr.
6,356,637 B1 3/2002 Garnett
6,560,494 B1 5/2003 Soto et al.
6,567,768 B1 * 5/2003 Matos et al. ................ 702/187
6,754,101 B2 6/2004 Terzioglu et al.
6,768,160 B1 7/2004 Li et al.
6,781,923 B1 * 8/2004 Lizzi .......................... 368/107
6,782,298 B2 8/2004 Soto et al.
7,171,610 B2 * 1/2007 Ash et al. ................... 714/799
2005/0216215 A1 * 9/2005 Yau ............................. 702/79

* cited by examiner

*Primary Examiner*—Guy Lamarre
*Assistant Examiner*—Fritz Alphonse
(74) *Attorney, Agent, or Firm*—Stetina Brunda Garred & Brucker

(57) ABSTRACT

A timer circuit for tracking an elapsed time of an electronic device is provided. The timer circuit compares differences in elapsed times written to memory addresses of a memory chip with a periodic interval to determine whether any elapsed times written to the memory chip is corrupt. If so, then the corrupt data is discarded and the device elapsed time is tracked once again based on a valid elapsed time.

6 Claims, 3 Drawing Sheets

SERIAL DATA PRESERVATION METHOD

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates to an electronic component with a timer circuit, and more particularly, to a timer circuit which may preserve its elapsed time data in the event of a failure to its power source.

Airplanes may comprise a plurality of electronic components which may be covered by a warranty program from the component manufacturer or system assembler. The warranty program may be based on a period of time from the date of component purchase. In the alternative, the warranty's lifetime may be based on total running time. For example, an airplane may comprise a plurality of circuit boards (i.e., electronic components). The circuit board may be covered under warranty for a period of 10,000 hours. In the regard, the warranty period may accrue once the circuit board is powered on. Also, the warranty period may be tolled when the circuit board is powered down. When the total accrued period of time of the circuit board equals 10,000 hours, then the warranty may be deemed to have expired for such circuit board.

To this end, the total accrued time which the circuit board was powered on may be provided by a timer circuit. The timer circuit may comprise a processor and memory wherein the processor writes the elapsed time to the memory at periodic intervals such as every one hour. The processor and memory may be powered by a power source of the circuit board. In other words, the power source of the circuit board also powers the timer circuit. However, if the power source were to fail during the time the processor writes to the memory, then the written data may be inaccurate or otherwise corrupt because the processor did not have sufficient power to write the elapsed time data to the memory for a sufficient period of time. To address the possibility of this event, the timer circuit may have a backup power supply. In other words, in the event that the circuit board power source were to fail during the processor write time, the backup power would provide additional power or the power required by the processor to write the elapsed time to memory. However, the backup power is an additional component required to be placed on or adjacent to the circuit board. Moreover, in designing an airplane, the weight of which is very sensitive, the backup power supply adds unwanted weight to the overall airplane.

Accordingly, there is a need in the art to provide for an improved timer circuit which does not have a substantial weight impact on the overall weight of the airplane as well as other advantages.

BRIEF SUMMARY OF THE INVENTION

In accordance with the present invention, a timer circuit is provided. The timer circuit may comprise a field programmable gate array (FPGA) and a memory chip. The timer circuit may be in electrical communication with an electronic device such as a line replaceable component (LRC) of an electronic system to determine an elapsed time of the LRC. In particular, the FPGA may have embedded thereon a program which writes an elapsed time value sequentially to a plurality of addresses on the memory chip (e.g., EEPROM) which may be sequential memory addresses or non sequential memory addresses. The power for the timer circuit may be provided by the same power provided to the LRC. In this regard, if the power to the LRC is turned off during the time the memory chip is being written to, then the written data may be corrupt. Upon power up, the timer circuit, and more particularly, a program embedded onto the FPGA may resume tracking elapsed time based on valid values of elapsed time written onto the memory chip and discarding any corrupt value(s).

Generally, the validation process includes comparing the elapsed time values of sequential memory addresses to check that all sequential addresses have sequential elapsed time values and each sequential elapsed time value is incremented by an amount equal to a predetermined time or periodic time interval. If not then at least one of the data is corrupt. The corrupt data is identified as the subsequent memory address of two sequential memory addresses which contains values with differences not equal to the periodic interval. In other words, the difference in values between two subsequent memory addresses is calculated. If the difference does not equal the periodic interval then at least one of its two subsequent memory addresses contain corrupt data, and more particularly, the latter or subsequent memory address contains the corrupt data and may be discarded. The remaining values written on the memory chip are valid and the elapsed time of the electronic device is resumed based on the remaining valid values.

Alternatively, the validation process may include comparing reordered elapsed time values to determine an out of sequence value and valid values with the largest remaining valid value being used to resume the elapsed time of the electronic device.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
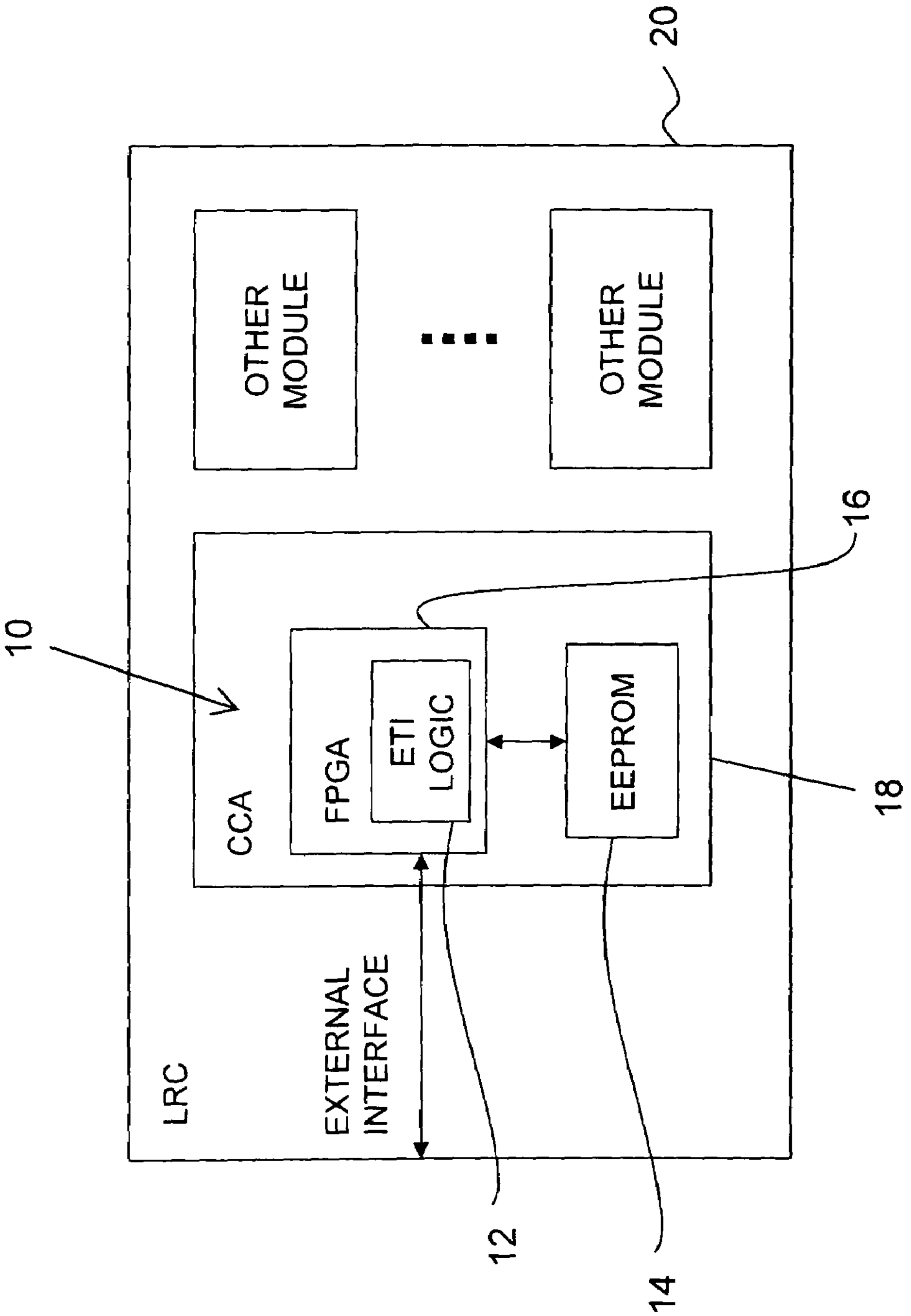
FIG. 1 is a schematic diagram of a line replaceable component with a timer circuit embedded within a field programmable gate array (FPGA) in electrical communication with an electrically eraseable programmable read only memory (EEPROM)

The figures referenced herein are for the purposes of illustrating the preferred embodiments of the present invention and not for the purposes of limiting any aspect(s) of the present invention. For example, FIG. 1 illustrates that a timer circuit 10 may comprise an elapsed time indicator (ETI) circuit 12 and an electrically eraseable programmable read only memory (EEPROM) 14 formed on a field programmable gate array (FPGA) 16 and circuit card assembly (CCA) 18, respectively. However, in this regard, the figures do not imply in any manner that the various aspects of the present invention are limited to the ETI circuit 12 and EEPROM 14 formed on the FPGA 16 and CCA 18, respectively.

FIG. 1 illustrates a schematic diagram of a line replaceable component (LRC) 20. In this regard, the LRC 20 may be integrated into the circuitry of an overall electrical system. For example, an airplane may have a plurality of LRCs 20 associated with its communications systems and other various systems. The plane manufacturer or the LRC manufacturer may provide for a warranty for the LRC 20. The time period for the warranty may be in terms of number of hours which the LRC 20 is powered on. In the alternative, the LRC 20 may be warranted in terms of flight hours of the airplane (i.e., powered on and the plane is in flight) or in terms of the date LRC 20 was provided or purchased. However, the basic premise for all schemes may be associated with an elapsed time of some characteristic with the LRC 20. For the purposes of explaining the various aspects of the present invention and not for the purpose of limiting the scope of the present invention, the elapsed time will be discussed in this detailed description as being the elapsed time for which the LRC 20 was powered on.

The LRC 20 may be a component on the airplane which may be removed from the airplane and delivered to the airplane manufacturer or the LRC manufacturer for service, repair or replacement. For example, the airplane manufacturer may sell an airplane with a plurality of LRCs 20 incorporated into the electronics of the airplane. During routine maintenance, if one of the LRCs 20 were to malfunction, the LRC 20 could be removed as a module then sent to the warrantor (e.g., airplane manufacturer or LRC manufacturer) for repair, service or replacement. However, if the warranty period has expired then the warrantor may notify the warrantee (e.g., airplane purchaser) that the LRC 20 is no longer under warranty.

The determination of whether the warranty period has elapsed may be determined with the timer circuit 10 which may be in communication with the LRC 20. The timer circuit 10 may comprise the FPGA 16 with a timer program embedded or programmed thereon, the steps of which are shown in flowchart of FIG. 2 and discussed further below. Also, the FPGA 16 may be in informational communication with a memory chip 14 such as an EEPROM. The timer circuit 10 may be able to store the elapsed time for the CCA 18 upon which the FPGA 16 and the memory chip 14 may be affixed to but may also store the elapsed time for the LRC 20 as well. However, for the purpose of clarification and simplification, the timer circuit 10 shall be discussed as tracking the elapsed time of only the LRC 20 even though a duplicate or similar circuit could be fabricated to keep track of the CCA elapsed time.

The timer circuit 10 may comprise the FPGA 16 and the memory chip 14 wherein the FPGA 16 and the memory chip 14 are in informational communication with each other. In other words, data may be transferred to and from the memory chip 14 and the FPGA 16 such as through an electrical connection.

Figure 3:
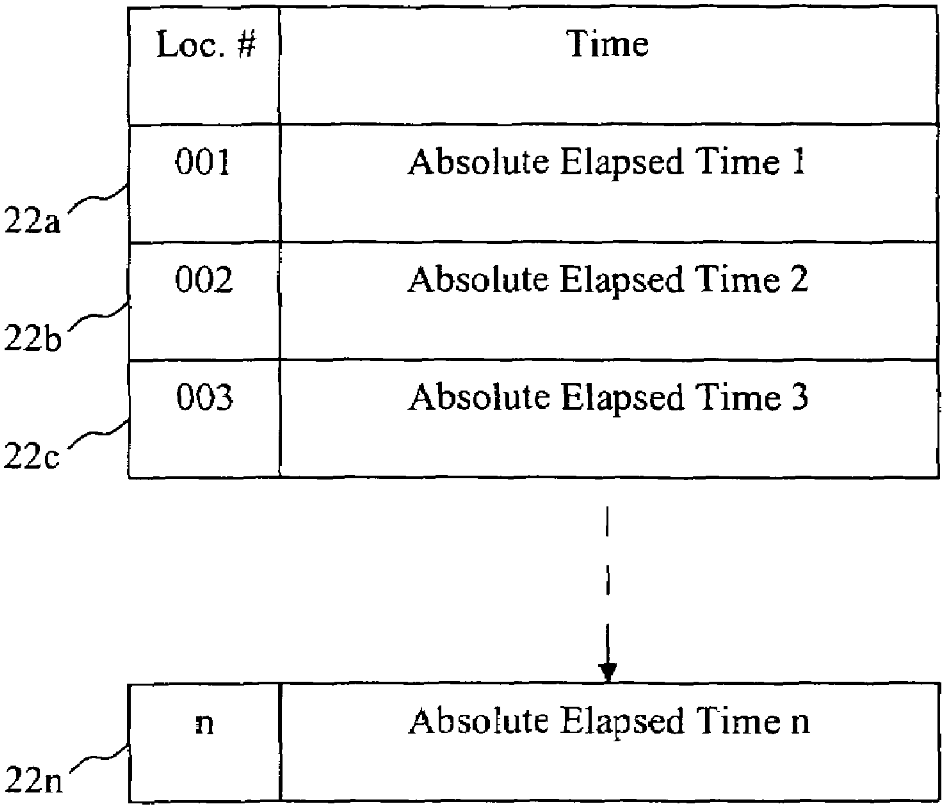
FIG. 3 is a visual representation of the memory addresses of the EEPROM.

The memory chip 14 may be an EEPROM. The memory chip 14 may define therein a plurality of unique addresses 22*a*, 22*b*, 22*c* such as 001, 002 and 003 etc, as shown in FIG. 3. There may be two or more unique addresses 22 defined by the memory chip 14 but preferably there are at least three unique memory addresses 22. Also, these unique addresses 22 may have information associated therewith such as elapsed time. The elapsed time may be written on the memory chip 14 and associated with a respective memory address 22 in the form of a hexadecimal number. The elapsed time may be written on each sequential memory address at pre-determined times. These pre-determined times may be derived from a periodic time interval wherein the time period of each interval is the same for subsequent intervals. For example, the periodic interval may be every one hour, every ten minutes, every six minutes or every one minute. For the purpose of simplification, the periodic interval may be every six minutes. In this regard, the pre-determined times will be zero minutes, six minutes, 12 minutes, 18 minutes and etc.

Figure 2:
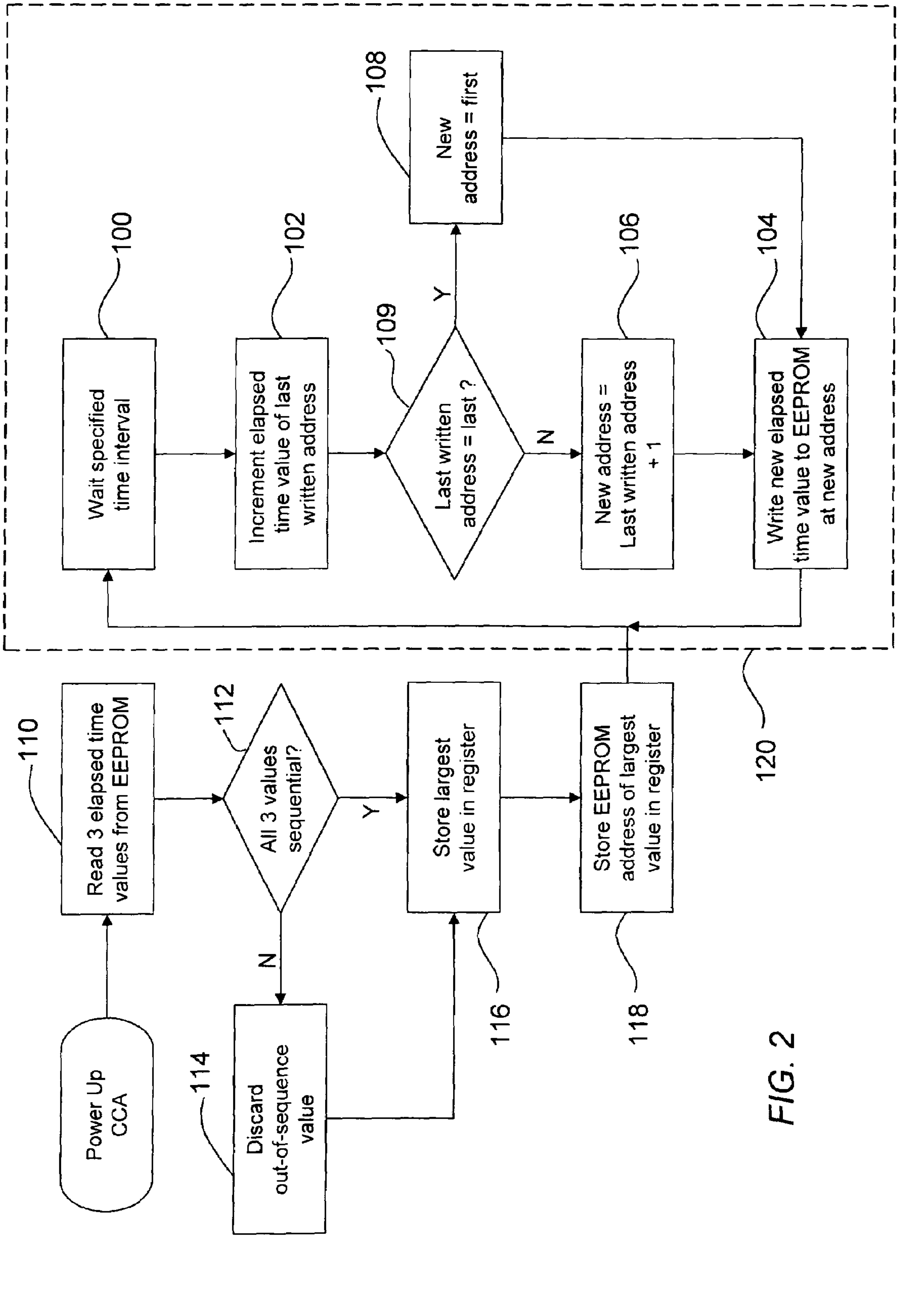
FIG. 2 is flow chart of a program embedded within the FPGA of FIG. 1 which identifies corrupt data written onto the EEPROM and discards such corrupt data.

A program, the steps of which are shown in FIG. 2, embedded on the FPGA 16 may comprise the following steps. When the LRC 20 is first powered on, an elapsed time of zero minutes may be written on the memory chip 14 at the first memory address 001 22*a*. This first memory address 22*a* may be considered at this point in time to be a new address. As such, at power up, the elapsed time of zero minutes is written on the memory chip 14 at the new address. The timer circuit waits until the next pre-determined time (see FIG. 2, step 100) then increments the elapsed time value (see FIG. 2, step 102) associated with the last written address (i.e., address 001, 22*a*) to the next pre-determined time and writes the incremented elapsed time to a new address (see FIG. 2, step 104) wherein the new address is now the last written address plus one (i.e., address 002, 22*b*; see FIG. 2, step 106). The timer circuit 10 waits (step 100) until the next pre-determined time again then increments (step 102) the elapsed time value associated with the last written address (i.e., address 002, 22*b*) to the next pre-determined time and writes the incremented elapsed time to a new address (step 104) wherein the new address is now the last written address (i.e., address 002, 22*b*) plus one (i.e., 003, 22*c*; step 106). The timer circuit waits (step 100) until the next predetermined time then increments (step 102) the elapsed time value associated with the last written address (i.e., address 003, 22*c*) to the next predetermined time and writes (step 104) the incremented elapsed time to a new address wherein the new address is now the first address 001 22*a* (see FIG. 2, step 108). The new address equal the first memory address 22*a* whenever the last written address is equal to the last address 22*n* of the memory chip 14 (step 109).

For example, the predetermined time may be based on a periodic time interval of six minutes. In this case, the elapsed time of the LRC 22 may be written on the memory chip 14 at every six minutes—0, 6, 12, 18, 24 and etc. minutes. At zero minutes (i.e., first time power up of the LRC 22), an elapsed time of zero minutes may be written on the memory chip 14 at the first memory location 001 22*a*. An elapsed time of six minutes may be written on the memory chip 14 at the second memory location 002, 22*b* after six minutes. An elapsed time of 12 minutes may be written on the memory chip 14 at the third memory location 003, 22*c* after six more minutes. After 18 minutes, an elapsed time of 18 minutes may be written on the memory chip 14 at the first memory location 001 22*a* after six more minutes if the memory chip 14 only has three memory addresses 22.

When the LRC 20 is powered down, the timer circuit 10 may also be powered down if the timer circuit 10 is powered via a LRC power source. In this regard, there is a possibility that the timer circuit 10 may not have sufficient power to write the elapsed time to the memory chip 14. In other words, the memory chip 14 is not instantaneously written to but requires time for the information to be written thereon. Moreover, power is also required to write information to the memory chip 14. Accordingly, if the LRC 20 is powered down during the time that an elapsed time is written to the memory chip 14, the information written onto the memory chip 14 may be corrupt—not valid. The steps discussed herein may be implemented to discard the corrupt values or data.

To discriminate valid data (i.e., valid values) and corrupt data (i.e., out-of-sequence data) upon powering the LRC 22 back up, the program with the following steps may be embedded onto the FPGA 16. In particular, upon powering the LRC 20 back up, the elapsed time values from all memory addresses 22*a*, 22*b*, 22*c* of the memory chip 14 are read (step 110). These read values are compared to each other, and more particularly, the differences in read values between sequential memory addresses 22*a*, 22*b*, and 22*c* are calculated. For example, the elapsed time value of memory address 001, 22*a* is subtracted from the elapsed time value of memory address 002, 22*b*. The elapsed time value of memory address 003, 22*c* is subtracted from the elapsed time value of memory address 002, 22*b*. Additionally, the elapsed time value of memory address 001, 22*a* is subtracted from the elapsed time value of memory address 003, 22*c*, if there are only three memory addresses 22*a*, 22*b*, 22*c*.

Thereafter, an out-of-sequence value and valid value may be determined based on the compared elapsed times or calculated difference discussed above. In this regard, the calculated differences should match the pre-determined times. If so, then all values are valid. If not, then at least one value is out-of-sequence. For example, if the predetermined times are based on a periodic time interval of six minutes, then the calculated differences should equal six minutes. If one of the calculated differences does not equal six minutes, then the elapsed time value of the out-of-sequence value is discarded (step 114). For example, if the calculated difference between the elapsed time values of the third and second memory addresses 003 (22*c*), 002 (22*b*) does not equal six minutes, then the elapsed time of the subsequent or latter memory address, namely, time values of memory addresses 001 22*a* and 002 22*b* are valid values. If the calculated difference between the elapsed time values of the third and first memory addresses 003 (22*c*), 001 (22*a*) does not equal six minutes, the elapsed time of the subsequent memory address, namely, address 001 22*a* is out-of-sequence and its elapsed time may be discarded. Also, the elapsed time values of memory addresses 002 22*b* and 003 22*c* are valid values.

Next, the elapsed times of the LRC 20 may be written to the memory chip 14 at respective memory addresses based on the valid values at the predetermined times. In this regard, the largest of the valid values may be stored on a register of the FPGA 16 along with its memory address 22, as shown in steps 116 and 118. The timer circuit 10 may wait (step 100) until the next predetermined time, and then increment (step 102) the stored valid value to the predetermined time and write (step 104) the incremented value to a new address. The new address is the last written address plus one if the stored address was not the last memory address 22*c*, as shown in step 106. Alternatively, the new address is the first memory address 22*a* if the stored address is the last memory address, as shown in step 108. For example, if the elapsed time values of memory addresses 002 22*b* and 003 22*c* are valid values and have associated therewith 12 minutes and 18 minutes, respectively, the elapsed time value of 18 minutes is stored (steps 116, 118) in the register of the FPGA 16 along with its memory address 003 22*c*. The timer circuit 10 may wait (step 100) until the next predetermined time which if based on a periodic interval of six minutes is six minutes from the time the LRC 20 was powered back up. At this point, the stored value of eighteen minutes may be incremented (step 102) to twenty four minutes and the incremented value (i.e., twenty four minutes) may be written (step 104) to the new address (i.e., memory address 001 22*a*). Thereafter, the elapsed times are written to the memory addresses as dictated by steps 120 shown in FIG. 2.

In this regard, the elapsed time value is accurate in that it ignores corrupt elapsed time values written to the memory chip 14. As such, during repair, service or replacement of the LRC, the warrantor may be able to determine whether the warranty period for the LRC 20 has expired based on the elapsed time values written on the memory chip 14.

In another aspect of the present invention, the validation process may alternatively include comparing the elapsed time values of non sequential memory addresses to check that each sequential elapsed time value written thereto—and not the values of sequential memory addresses—is incremented by an amount equal to a predetermined time or periodic time interval. In particular, the elapsed time values written to non sequential addresses are reordered with respect to the written elapsed time values. Thereafter, the reordered elapsed time values are compared to each other to determine which value is out of sequence. The out of sequence value is one which is not incremented by the periodic interval or predetermined time and is corrupt. The remaining values are valid and the elapsed time of the electronic device is resumed based on the largest remaining valid values.

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. An electronic component comprising:

a. a memory chip defining first, second and third memory addresses with elapsed times of the electronic component storeable in the first, second and third memory addresses; and b. a processor with a program loaded on the processor, the program comprising the steps of:

i. writing a first elapsed time of the electronic component to the first memory address of the memory chip;

ii. after a first pre-determined time interval, writing a second elapsed time of the electronic component to the second memory address of the memory chip;

iii. after a second pre-determined time interval, writing a third elapsed time of the electronic component to the third memory address of the memory chip;

iv. reading the elapsed times stored in the memory addresses;

v. comparing a difference in the elapsed times written to the sequential memory addresses to a corresponding one of the pre-determined time intervals wherein the elapsed time written to a latter of the sequential memory addresses is out-of-sequence if the difference is greater than or less than the corresponding one of the pre-determined time intervals; and iv. discarding the out-of-sequence elapsed time.

2. The electronic component of claim 1 wherein the memory chip is an electrically erasable programmable read only memory.

3. The electronic component of claim 1 wherein the program is embedded on a field programmable gate array.

4. A method of tracking an elapsed time of an electronic component, the method comprising the steps of:

a. writing elapsed times of the electronic component to sequential memory addresses of a memory chip at pre-determined time intervals;

b. reading the elapsed times stored in the sequential memory addresses;

c. comparing a difference in the elapsed times written to the sequential memory addresses to a corresponding one of the pre-determined time interval wherein the elapsed time written to a latter of the sequential memory addresses is out-of-sequence if the difference is greater than or less than the corresponding one of the pre-determined time intervals;

d. discarding the out-of-sequence elapsed time.

5. The method of claim 4 wherein the writing step is accomplished by writing elapsed times of the electronic component to sequential memory addresses of an electrically erasable programmable read only memory.

6. The method of claim 4 further comprising the step of providing a program embedded on a field programmable gate array, the program operative to perform steps a-d.

* * * * *